United States Patent [19]
Thorborg

[11] 3,829,759
[45]*Aug. 13, 1974

[54] MEANS FOR GENERATING REACTIVE POWER

[75] Inventor: Kjeld Thorborg, Vasteras, Sweden

[73] Assignee: Allmanna Svenska Elektriska Aktiebolaget, Vastera, Sweden

[ * ] Notice: The portion of the term of this patent subsequent to June 19, 1990, has been disclaimed.

[22] Filed: Jan. 18, 1973

[21] Appl. No.: 218,844

[52] U.S. Cl.............. 323/119, 323/102, 323/106, 323/127
[51] Int. Cl................................................ G05f
[58] Field of Search .......... 323/101, 102, 105, 106, 323/119, 127; 321/9, 27 R

[56] References Cited
UNITED STATES PATENTS

| | | | |
|---|---|---|---|
| 1,947,231 | 2/1934 | Sabbah | 323/119 |
| 3,740,638 | 6/1973 | Thorborg | 323/105 |
| 3,768,001 | 10/1973 | Thorborg | 321/27 R |

FOREIGN PATENTS OR APPLICATIONS

| | | | |
|---|---|---|---|
| 557,789 | 2/1957 | Italy | 323/119 |

Primary Examiner—William H. Beha, Jr.

[57] ABSTRACT

An arrangement for generating reactive power includes first and second line-commutated converters, the AC terminals of which are connected to an alternating voltage network to which a capacitor bank is also connected. Two branchless connections connect the converters in anti-parallel relation on the DC side and constitute an unloaded DC intermediate line, each DC terminal of each converter being connected by a branchless reactor connection to a DC terminal of the other converter.

9 Claims, 6 Drawing Figures

MEANS FOR GENERATING REACTIVE POWER

BACKGROUND OF THE INVENTION

1. Field of the Invention

The invention relates to a means for generating reactive power.

2. The Prior Art

In many applications a component is required which can be connected to an alternating voltage network and which, as far as possible without losses, generates reactive power which can simply and rapidly be regulated within wide limits. It is already known for this purpose to use a converter connected to the network, between the DC terminals of which a reactor is connected. The direct current of the converter will thus be smoothed because of the reactor, and almost constant. The currents in the AC lead-ins of the converter will therefore consist of square pulses and thus be relatively rich in harmonics, the fifth and seventh harmonics usually dominating in the three-phase connection.

SUMMARY OF THE INVENTION

The present invention relates to a means to considerably reduce the percentage of harmonics in the current in a simple manner, and thus also all the drawbacks associated therewith.

According to the invention, an arrangement for generating reactive power includes first and second line-commutated converters, the AC terminals of which are connected to an alternating voltage network to which a capacitor bank is also connected. Two branchless connections connect the converters in anti-parallel relation to the DC side and constitute an unloaded DC intermediate line, each DC terminal of each converter being connected by a branchless reactor connection to a DC terminal of the control converter.

BRIEF DESCRIPTION OF THE DRAWINGS

The accompanying

DESCRIPTION OF THE PREFERRED EMBODIMENTS

Figure 1:
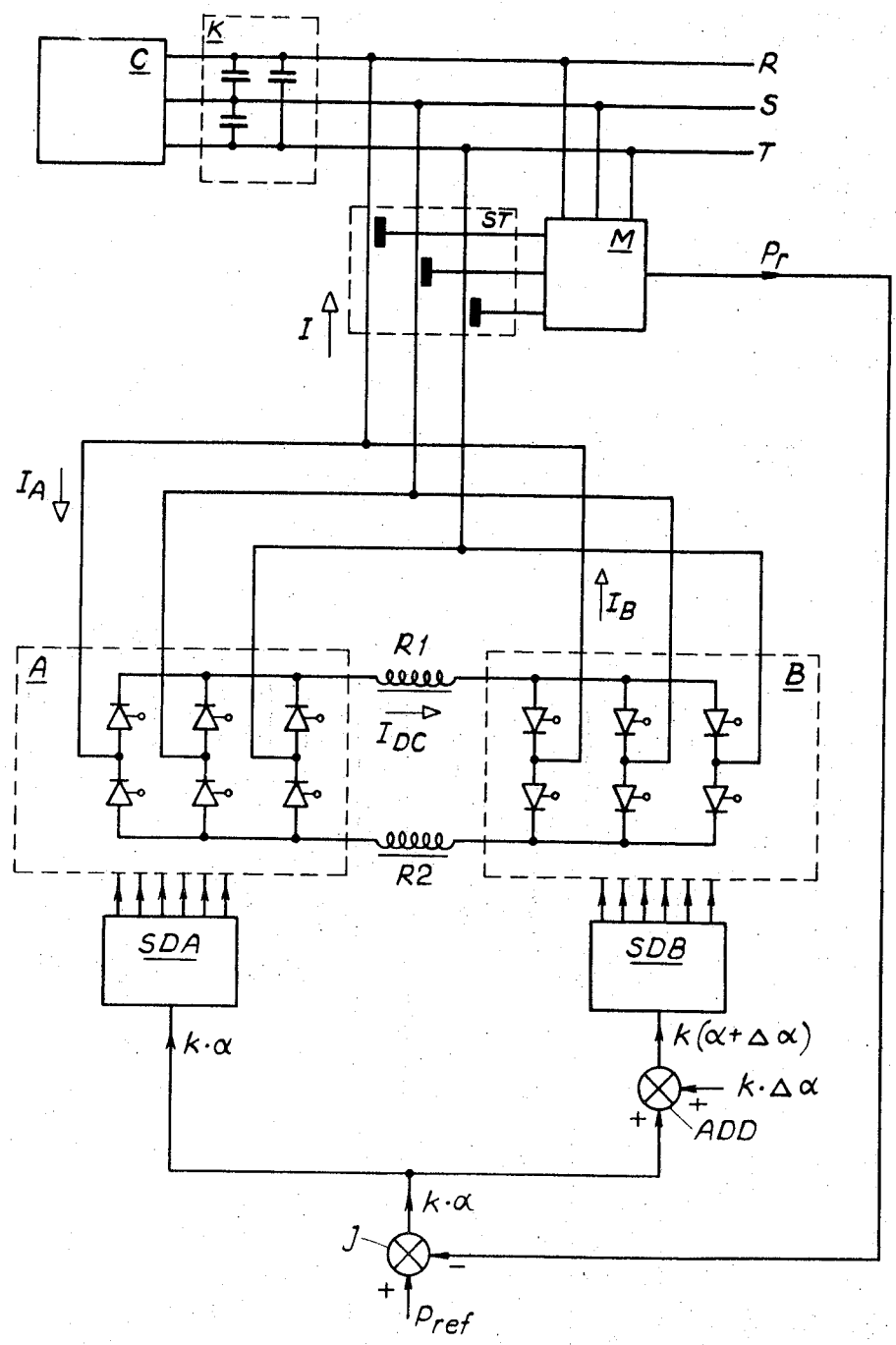
FIG. 1 shows one embodiment of the invention.

In FIG. 1, C is a load-commutated inverter, known per se, which emits active power to the three-phase network R, S, T. K is a three-phase capacitor bank connected to the network. The two converters A and B, which are of line-commutated type, are AC connected in parallel with the network and DC anti-parallel connected together over the reactors R1 and R2. The reactors comprise an un-loaded DC intermediate line, by which is meant that the intermediate line has no branches or outputs for the connection of a DC load object. However, protective or alarm circuits, measuring members, etc., may of course be connected to the intermediate line. The rectifiers in the converter A receive firing pulses from a control pulse device SDA. The control angle $\alpha$ can be varied depending on a signal $k \cdot \alpha$ supplied to the control device. The same signal is supplied to the control pulse device SDB of the converter B over a summation circuit ADD, where a magnitude $k \cdot \Delta\alpha$ is added to the signal. SDB is there added to the signal $k(\alpha + \Delta\alpha)$ and controls the rectifiers of the converter B with a control angle $\alpha + \Delta\alpha$.

The current transformers ST measure the current I supplied from the converters to the network, and a member M, with the help of this current and of the line voltage, forms a magnitude $P_r$ which corresponds to the reactive power fed to the network. In the comparison means J, $P_r$ is compared with a magnitude $P_{ref}$ corresponding to the desired power, and the difference $k \cdot \alpha$ is supplied to the control pulse device of the converters, as mentioned.

In the first approximation the resistance of the DC circuit can be disregarded and the active power fed to the converters from the network will therefore also be negligible.

The alternating current $I_A$ flows to A and the current $I_B$ from B. The current I flows to the network, constituting the vector difference between $I_B$ and $I_A$.

In the case shown A operates as a rectifier and B as an inverter. Since the resistance of the reactors is negligible, their direct voltages must as the current is finite, be equally large and oppositely directed, i.e., the sum of their control angles will be 180°.

Figure 2:
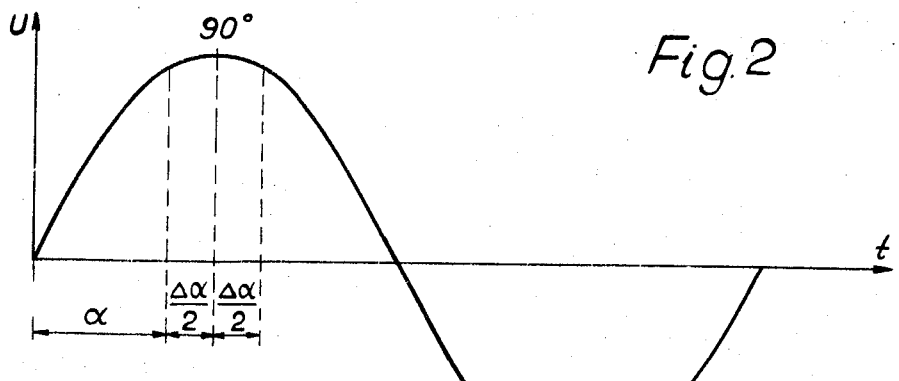
FIG. 2 shows the relationship between the control angles of the converters.

The difference between the control angles is $\Delta\alpha$ and consequently the control angle for A will be $\alpha = 90° - \Delta\alpha/2$ and the control angle for B will be $\alpha + \Delta\alpha = 90° + \Delta\alpha/2$. This is shown in FIG. 2, where the sine curve shows one of the voltages in the AC network.

In reality both the converters and the reactors offer a certain DC resistance. For a direct current $I_{DC}$ to flow, therefore $\alpha$ must be slightly less than said value $90° - \Delta\alpha/2$. Decreased $\alpha$ gives increased current $I_{DC}$, and thus an increase of the generated reactive power.

The closed regulating system consisting of ST, M, J, SDA and SDB, A and B will adjust $\alpha$ so that $P_r$ and $P_{ref}$ are substantially equal so that the desired reactive power, predetermined through $P_{ref}$ is supplied to the network. Deviation of the control angles from the values $90° - \Delta\alpha/2$ and $90° + \Delta\alpha/2$ mentioned above will be very small and, for most purposes, negligible.

Figure 3A:
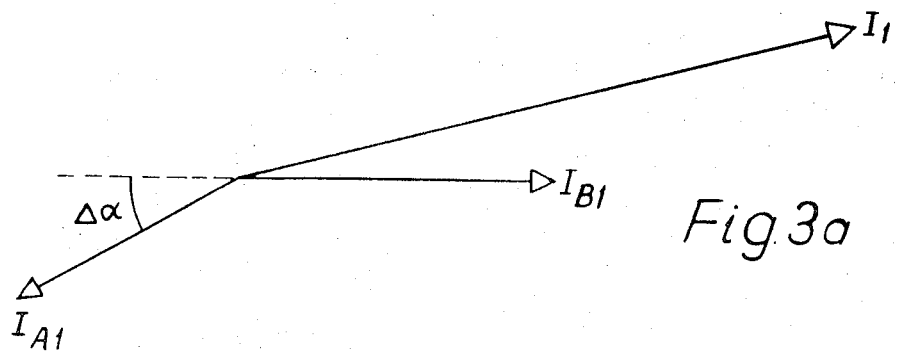
FIG. 3 shows how the alternating currents of the two converters are combined to the current supplied to the network.

FIG. 3a shows in vector form the basic harmonics $I_{A1}$ and $I_{B2}$ of the currents $I_A$ and $I_B$. The difference between these vectors form the basic harmonic $I_1$ of the current I, as mentioned above. The diagram is drawn under the assumption that $\Delta\alpha = 30°$, i.e., that $\alpha = 75°$ and $\alpha + \Delta\alpha = 105°$, which has been found to be a suitable value. As can be seen, the absolute value of $I_1$ will be equal to the sum of the absolute values of $I_{A1}$ and $I_{B1}$. $\Delta\alpha$ is preferably between 20° and 40°.

Figure 3B:
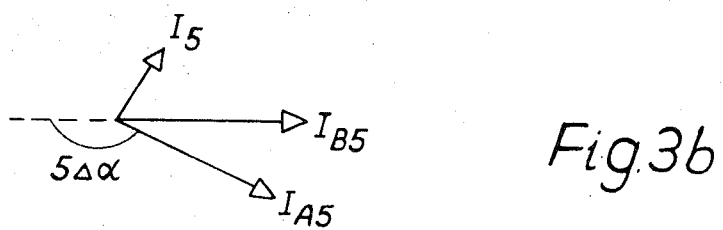

FIG. 3 shows with the fifth harmonic of $I_B$, $I_{B5}$, as reference vector, the vector $I_{A5}$, which is the fifth harmonic of $I_A$. As can be seen, the fifth harmonic, $I_5$, of the current I will be considerably smaller than the fifth harmonic of each converter.

Figure 3C:
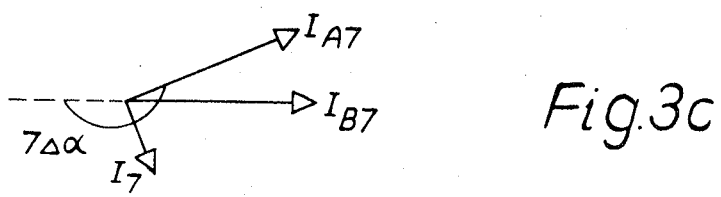

The same is true of the seventh harmonic of I, namely $I_7$, shown in FIG. 3c.

In this way an extremely great reduction of the harmonics in the current is obtained in comparison with the known connection, previously mentioned, having a single converter. The filter circuits have thus been considerably reduced in size, or may even have become superfluous.

Figure 4:
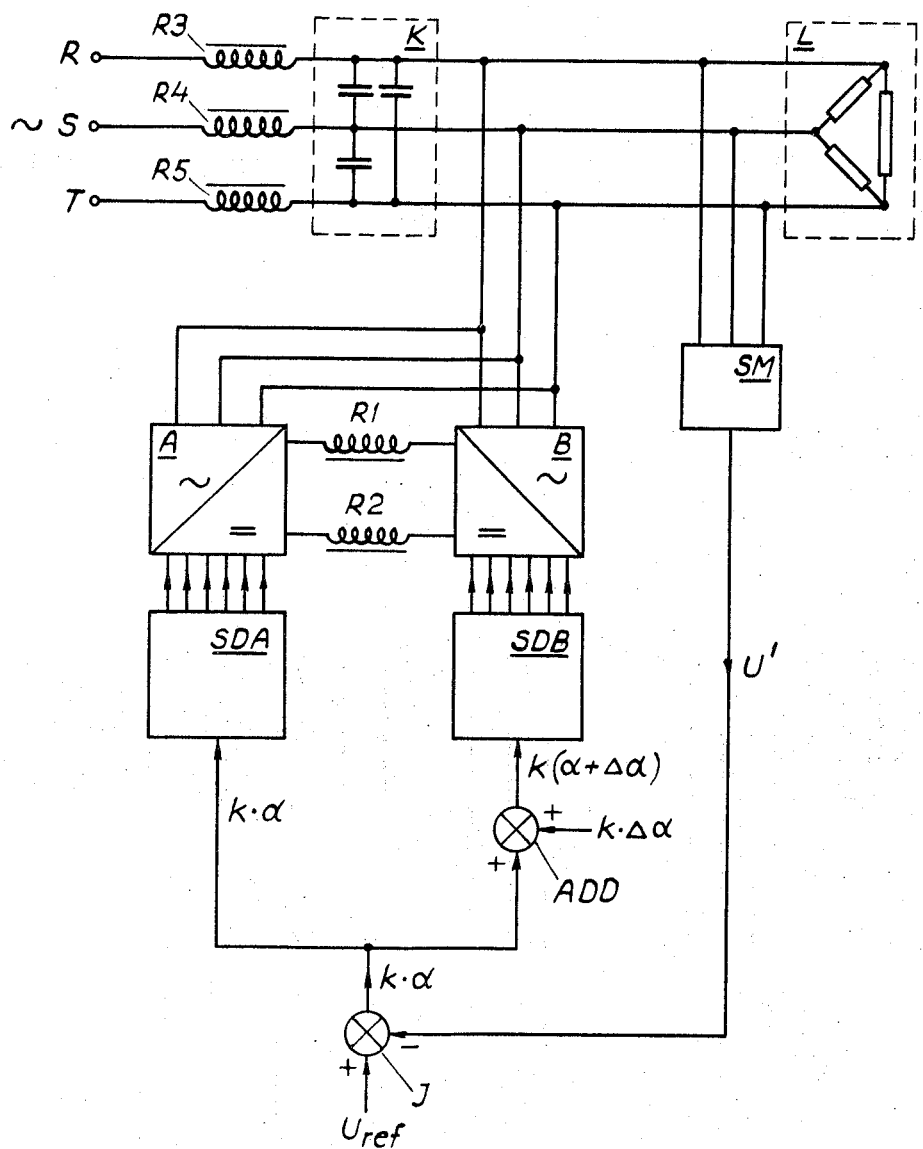
FIG. 4 shows the device used in a connection for alternating voltage control.

FIG. 4 shows the device according to the invention used in a connection for AC control. A load object L is connected over the reactors $R_3$, $R_4$, $R_5$ to the three-phase network R, S, T. Between the reactors and the load a capacitor bank K and a double converter connection according to the invention are connected. As in FIG. 1, the latter consists of the converters A and B with their control pulse devices SDA and SDB and the reactors $R_1$ and $R_2$. A voltage measuring device SM produces a magnitude $U'$ corresponding to the voltage supplied to the load, this magnitude being compared at J with the voltage reference $U_{ref}$. The deviation is supplied to SDA and, after addition of a constant quantity, to SDB in a corresponding manner as in FIG. 1. The converter connection generates a reactive power dependent on the deviation, and in this way the voltage drop in the reactors $R_3$, $R_4$, $R_5$, is affected, and thus voltage at the load object, which is controlled in agreement with the reference value $U_{ref}$.

If desired, each of the reactors $R_1$ and $R_2$ may be replaced by a series-connection of two (or possibly more) reactors, one of which is arranged to be saturated if passed by a current which is essentially lower than the maximum direct current occurring. The need for inductance falls, as is known, with increasing direct current, and by means of this embodiment a considerable reduction in the total rated power of the reactors can be achieved.

In the example shown the delay ($\Delta\alpha$) between the converters had a constant value. The extent to which the harmonics are reduced is dependant on the magnitude of the delay, as shown above, and this can be made manually or automatically variable so that the percentage of harmonics is made to fulfil a set criterium.

The control pulse device of the converters may be designed so that in each of the converters, each group of rectifiers connected to one phase-conductor is controlled with a control angle independent of the other groups. The degree of asymmetry can for example be adjusted so that it counteracts the asymmetry in the current consumed by a load object that is to say, the device generates the negative sequence current consumed by the object and unloads the feeding voltage source from this current. Possibly a measuring device such as is shown in U.S. Pat. No. 3,740,638 may be arranged to produce magnitudes corresponding to the degree of asymmetry in the alternating voltage, and these may be arranged to influence the control angles of the various rectifer groups in such a direction that the asymmetry tends to decrease. In this way a load voltage, for example, may be automatically brought to full symmetry, within wide limits irrespective of the asymmetry in the current consumed by the load.

I claim:

1. Means for generating reactive power, which comprises a first and a second line-commutated converter, each with AC terminals for connection to an alternating voltage network, a capacitor bank for connection to said network, two branchless reactor connections anti-parallel connecting the converters on the DC side and constituting an unloaded DC intermediate line, each DC terminal of each converter being connected by a branchless reactor connection to a DC terminal of the other converter.

2. Means according to claim 1, which comprises control pulse devices arranged to emit firing pulses to the rectifiers in the two converters in such a way that each rectifier in the second converter is fired with a certain delay in relation to the firing of the corresponding rectifier in the first converter, said delay being substantially equal for all the rectifiers of the second converter.

3. Means according to claim 2, in which sensing members are arranged to sense a magnitude corresponding to the total reactive power generated by both converters and to influence said control pulse devices to influence the firing times of the rectifiers in accordance with the deviation of said power from a desired value.

4. Means according to claim 2, in which said delay has a contant value.

5. Means according to claim 4, in which the delay has a value corresponding to an electric angle of between 20° and 40°.

6. Means according to claim 2, in which said delay is variable.

7. Means according to claim 2, in which the sensing members are voltage sensing members including means to sense the voltage at a point in the AC network and to influence said control devices to affect the firing times of the rectifiers, in dependence upon the deviation between said voltage and a desired value.

8. Means according to claim 2, in which said control pulse devices include means to control the rectifiers of a converter so that each group of rectifiers connected to the same phase-conductor is fired with substantially the same control angle.

9. Means according to claim 8, in which said sensing members are voltage sensitive members for sensing the asymmetry in the alternating voltage at a point in the alternating voltage network and, dependent on the magnitude of the asymmetry, to influence the control angles for said groups.

* * * * *

UNITED STATES PATENT OFFICE
CERTIFICATE OF CORRECTION

Patent No. 3,829,759      Dated August 13, 1974

Inventor(s) Kjeld Thorborg

It is certified that error appears in the above-identified patent and that said Letters Patent are hereby corrected as shown below:

In the heading, insert:

Claims priority, Application Sweden
January 18, 1971, 508/71

Signed and sealed this 29th day of October 1974.

(SEAL)
Attest:

McCOY M. GIBSON JR.
Attesting Officer

C. MARSHALL DANN
Commissioner of Patents